(12) United States Patent
Yamamoto

(10) Patent No.: US 6,832,971 B2
(45) Date of Patent: Dec. 21, 2004

(54) TOROIDAL CONTINUOUSLY VARIABLE TRANSMISSION

(75) Inventor: Takeshi Yamamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 13 days.

(21) Appl. No.: 10/345,372

(22) Filed: Jan. 16, 2003

(65) Prior Publication Data

US 2003/0158011 A1 Aug. 21, 2003

(30) Foreign Application Priority Data

Feb. 18, 2002 (JP) ........................................ 2002-039457

(51) Int. Cl.$^7$ ............................................. F16H 15/38
(52) U.S. Cl. ..................... 475/217; 475/216; 476/40; 476/46; 384/569; 384/571
(58) Field of Search ................................. 475/216, 217; 476/40, 46, 42; 384/558, 569, 571

(56) References Cited

U.S. PATENT DOCUMENTS

| | | | | |
|---|---|---|---|---|
| 3,951,483 A | * | 4/1976 | Nakamura | ................... 384/565 |
| 4,126,052 A | * | 11/1978 | Jackman | ................... 476/46 X |
| 5,007,747 A | * | 4/1991 | Takeuchi et al. | ........ 384/571 X |
| 5,651,750 A | * | 7/1997 | Imanishi et al. | ............... 476/40 |

FOREIGN PATENT DOCUMENTS

| | | | |
|---|---|---|---|
| JP | 58-112762 U | 8/1983 | |
| JP | 157151 | * 6/1993 | ............... 476/40 X |
| JP | 2002-243011 A | 8/2002 | |

OTHER PUBLICATIONS

U.S. patent application Ser. No. 10/290,249, Yamamoto, filed Nov. 8, 2002.

* cited by examiner

*Primary Examiner*—Ha Ho
(74) *Attorney, Agent, or Firm*—Foley & Lardner LLP

(57) ABSTRACT

A power roller for a toroidal continuously variable transmission includes: an inner wheel, an outer wheel a power roller bearing for bearing the inner wheel. The power roller bearing includes an inner wheel orbital face formed on the inner wheel, an outer wheel orbital face formed on the outer wheel, and a rolling element interposed between the inner wheel orbital face and the outer wheel orbital face. The rolling element is shaped into a frustum of a cone. A first contact is made between one of the following while a second contact is made between the other of the following: the rolling element and the inner wheel orbital face, and the rolling element and the outer wheel orbital face. The first contact is a point and the second contact is a line. Otherwise, the first contact is shorter in width than the second contact.

12 Claims, 8 Drawing Sheets

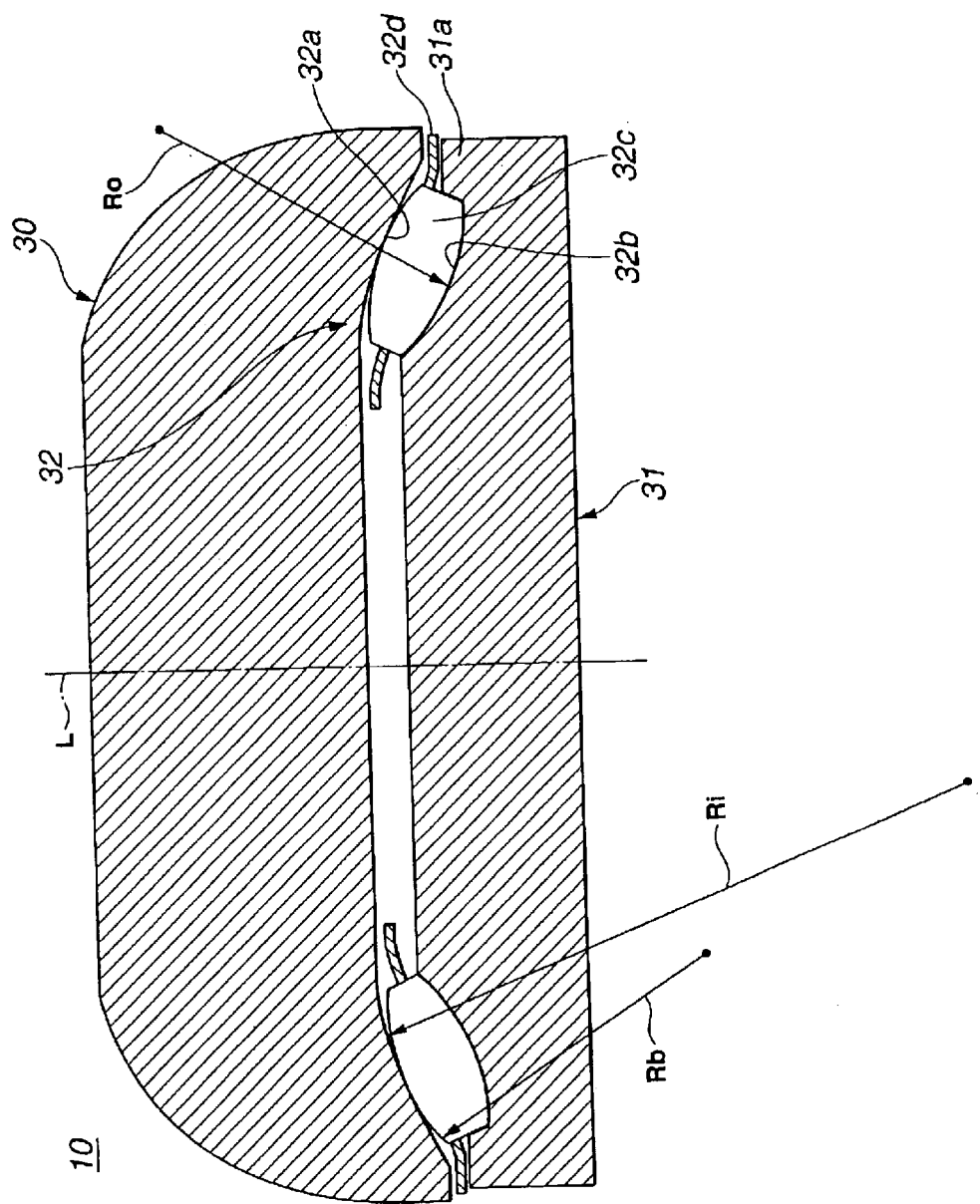

TOROIDAL CONTINUOUSLY VARIABLE TRANSMISSION

BACKGROUND OF THE INVENTION

1. Field of the Invention

The present invention relates to a toroidal continuously variable transmission used for a vehicle.

2. Description of the Related Art

Japanese Utility Model Unexamined Publication No. 58(1983)-112762 discloses a toroidal continuously variable transmission using a conical roller bearing having a conical roller as a rolling element. In this publication, the toroidal continuously variable transmission has a first contact made between the conical roller and an inner wheel orbital face, and a second contact made between the conical roller and an outer wheel orbital face. Being a line contact, each of the first contact and the second contact is high in rigidity, thus causing ununiformity in load applied to the rolling element of the bearing of a power roller of the toroidal continuously variable transmission.

BRIEF SUMMARY OF THE INVENTION

It is an object of the present invention to provide a toroidal continuously variable transmission with an enhanced durability of a bearing of a power roller. To enhance the durability of the bearing of the power roller, ununiformity in load applied to the rolling element is redressed by reducing rigidity of a contact between a rolling element and a wheel orbital face.

According to a first aspect of the present invention, there is provided a toroidal continuously variable transmission comprising:

1) a first input disc formed with a toroidal groove;
2) a second input disc formed with a toroidal groove;
3) an output disc formed with:
   a first toroidal groove opposed to the toroidal groove of the first input disc, and
   a second toroidal groove opposed to the toroidal groove of the second input disc;
4) a trunnion; and
5) a plurality of power rollers each of which is interposed in one of the positions including the following;
   I) between a wall of the toroidal groove of the first input disc and a wall of the first toroidal groove of the output disc, and
   II) between a wall of the toroidal groove of the second input disc and a wall of the second toroidal groove of the output disc,
   each of the power rollers being gyratorily held with the trunnion,
   each of the power rollers comprising;
   i) an inner wheel for transmitting a power of one of the first input disc and the second input disc to the output disc,
   ii) an outer wheel held with the trunnion, and
   iii) a power roller bearing for bearing the inner wheel in such a manner that the inner wheel rotates relative to the outer wheel, the power roller bearing comprising;
   A) an inner wheel orbital face formed on the inner wheel,
   B) an outer wheel orbital face formed on the outer wheel, and
   C) a rolling element interposed between the inner wheel orbital face and the outer wheel orbital face, the rolling element being shaped substantially into a frustum of a cone, a point contact being made between one of the following while a line contact being made between the other of the following:
   a) the rolling element and the inner wheel orbital face, and
   b) the rolling element and the outer wheel orbital face.

According to a second aspect of the present invention, there is provided a toroidal continuously variable transmission comprising:

1) a first input disc formed with a toroidal groove;
2) a second input disc formed with a toroidal groove;
3) an output disc formed with:
   a first toroidal groove opposed to the toroidal groove of the first input disc, and
   a second toroidal groove opposed to the toroidal groove of the second input disc;
4) a trunnion; and
5) a plurality of power rollers each of which is interposed in one of the positions including the following;
   I) between a wall of the toroidal groove of the first input disc and a wall of the first toroidal groove of the output disc, and
   II) between a wall of the toroidal groove of the second input disc and a wall of the second toroidal groove of the output disc,
   each of the power rollers being gyratorily held with the trunnion,
   each of the power rollers comprising;
   i) an inner wheel for transmitting a power of one of the first input disc and the second input disc to the output disc,
   ii) an outer wheel held with the trunnion, and
   iii) a power roller bearing for bearing the inner wheel in such a manner that the inner wheel rotates relative to the outer wheel, the power roller bearing comprising;
   A) an inner wheel orbital face formed on the inner wheel,
   B) an outer wheel orbital face formed on the outer wheel, and
   C) a rolling element interposed between the inner wheel orbital face and the outer wheel orbital face, the rolling element being shaped substantially into a frustum of a cone, a first contact width being made between one of the following while a second contact width greater than the first contact width being made between the other of the following:
   a) the rolling element and the inner wheel orbital face, and
   b) the rolling element and the outer wheel orbital face.

According to a third aspect of the present invention, there is provide a power roller for a toroidal continuously variable transmission, the power roller comprising:

i) an inner wheel for transmitting a power of an input disc (3, 4) to an output disc,
ii) an outer wheel held with a trunnion, and
iii) a power roller bearing for bearing the inner wheel in such a manner that the inner wheel rotates relative to the outer wheel, the power roller bearing comprising;
A) an inner wheel orbital face formed on the inner wheel,
B) an outer wheel orbital face formed on the outer wheel, and C) a rolling element interposed between the inner wheel orbital face and the outer wheel orbital face, the rolling element being shaped substantially into a frustum of a cone, a first contact being made between one of the following while a second contact being made between the other of the following:
   a) the rolling element and the inner wheel orbital face, and
   b) the rolling element and the outer wheel orbital face.

According to a fourth aspect of the present invention, there is provided a power roller for a toroidal continuously variable transmission, the power roller comprising:
   i) an inner wheel for transmitting a power of an input disc (3, 4) to an output disc,
   ii) an outer wheel held with a trunnion, and
   iii) a power roller bearing for bearing the inner wheel in such a manner that the inner wheel rotates relative to the outer wheel, the power roller bearing comprising;
      A) an inner wheel orbital face formed on the inner wheel,
      B) an outer wheel orbital face formed on the outer wheel, and
      C) a rolling element interposed between the inner wheel orbital face and the outer wheel orbital face, the rolling element being shaped substantially into a frustum of a cone, a first contact width being made between one of the following while a second contact width greater than the first contact width being made between the other of the following:
         a) the rolling element and the inner wheel orbital face, and
         b) the rolling element and the outer wheel orbital face.

The other objects and features of the present invention will become understood from the following description with reference to the accompanying drawings.

BRIEF DESCRIPTION OF THE SEVERAL; VIEWS OF THE DRAWINGS

FIG. 11 is a cross section of the first power roller 10 adopted into the toroidal continuously variable transmission, according to a fifth embodiment of the present invention.

DETAILED DESCRIPTION OF THE EMBODIMENT

In the following, various embodiments of the present invention will be described in detail with reference to the accompanying drawings.

For ease of understanding, the following description will contain various directional terms, such as, left, right, upper, lower, forward, rearward and the like. However, such terms are to be understood with respect to only a drawing or drawings on which the corresponding part of element is illustrated.

Hereinafter described are embodiments for embodying a toroidal continuously variable transmission (hereinafter referred to as "toroidal CVT").

Hereinafter described at first is a construction of the toroidal CVT.

Figure 1:
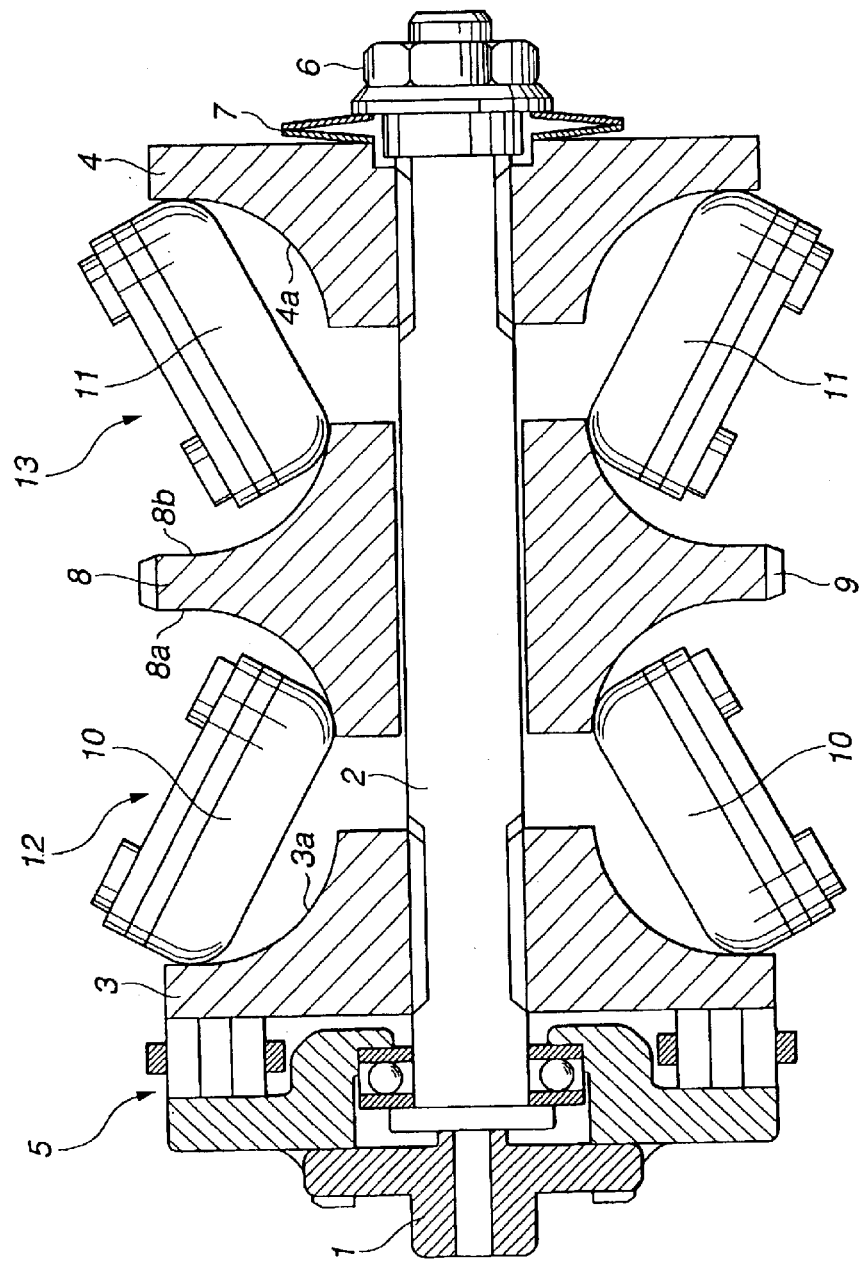
FIG. 1 is a schematic of a mechanism of a toroidal continuously variable transmission.

FIG. 1 is a schematic of the construction of a transmission mechanism of the toroidal CVT. A driving force from an engine (not shown) is transmitted to an input shaft 1 via a torque converter (not shown) and a forward-rearward switchover gear (not shown).

A torque transmission shaft 2 is disposed coaxially with input shaft 1. Torque transmission shaft 2 has a first end (left in FIG. 1) splined with a first input disc 3 and a second end (right in FIG. 1) splined with a second input disc 4, in such a manner that first input disc 3 and second input disc 4 can move in an axial direction.

Between a back face (of first input disc 3) and input shaft 1, there is interposed a loading cam mechanism 5 for generating a thrust force in the axial direction in accordance with an input torque.

There is provided a nut 6 which is screwed down on an end of torque transmission shaft 2. Between a back face (of second input disc 4) and nut 6, there is interposed a belleville spring 7 which applies a preload to first input disc 3 and second input disc 4.

In substantially a center between first input disc 3 and second input disc 4, there is provided an output disc 8 which mounts to torque transmission shaft 2 with play. Output disc 8 is made in such a manner that back faces of respective two output discs are united with each other. Output disc 8 has an outer periphery formed with an output gear 9.

First input disc 3 is formed with a toroidal groove 3a opposed to output disc 8, while second input disc 4 is formed with a toroidal groove 4a opposed to output disc 8. On the other hand, output disc 8 is formed with a first toroidal groove 8a opposed to first input shaft 3 and a second toroidal groove 8b opposed to second input shaft 4.

On each of a right side and a left side of torque transmission shaft 2, there is provided a first power roller 10 which is interposed between toroidal groove 3a and first toroidal groove 8a. The thus provided two first power rollers 10, 10 can transmit a power by friction.

Likewise, on each of the right side and the left side of torque transmission shaft 2, there is provided a second power roller 11 which is interposed between toroidal groove 4a and second toroidal groove 8b. The thus provided two second power rollers 11, 11 can transmit the power by friction.

In sum, a first toroidal transmission 12 is constituted of first input disc 3, output disc 8 (first toroidal groove 8a) and the pair of first power rollers 10, 10, while a second toroidal transmission 13 is constituted of second input disc 4, output disc 8 (second toroidal groove 8b) and the pair of second power rollers 11, 11.

With the transmission mechanism described above, each of first power rollers 10, 10 can gyrate through an operation (to be described afterward) to realize gyration angle corresponding to a target change gear ratio, thereby transmitting input rotation of first input disc 3 to output disc 8 via first power rollers 10, 10 in a continuously variable manner. Likewise, each of second power rollers 11, 11 can gyrate through the operation (to be described afterward) to realize gyration angle corresponding to a target change gear ratio, thereby transmitting input rotation of second input disc 4 to output disc 8 via second power rollers 11, 11 in a continuously variable manner.

Figure 2:
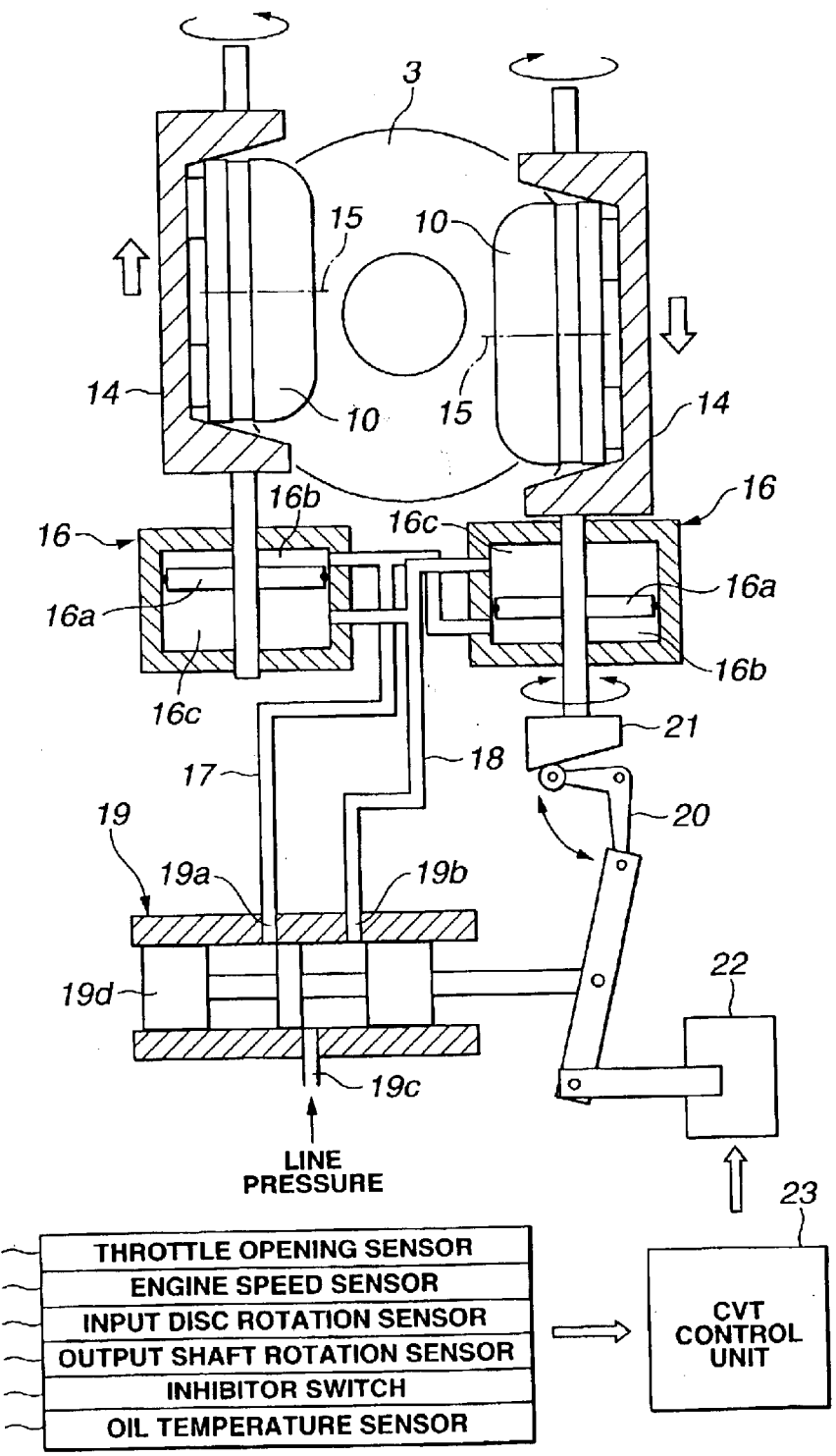
FIG. 2 is a schematic of a control system of the toroidal continuously variable transmission.

FIG. 2 shows a schematic of a control system of the toroidal CVT.

Each of first power rollers 10, 10 is held to a first end of one of trunnions 14, and gyrates around one of power roller shafts 15. Each of trunnions 14 has a second end provided with a servo piston 16. Servo piston 16 acts as a hydraulic actuator for tilting one of first power rollers 10, 10 by moving one of trunnions 14, 14 axially.

Likewise, each of second power rollers 11, 11 is held to a first end of one of two trunnions (not shown). Each of the trunnions (not shown) has a second end provided with a servo piston (not shown). The servo piston (not shown) acts as a hydraulic actuator for tilting one of second power rollers 11, 11 by moving one of the trunnions (not shown) axially.

For synchronization, the above four trunnions {namely, two trunnions 14, 14 and the two trunnions (not shown)} respectively holding first power rollers 10, 10 and second power rollers 11, 11 are connected to a synchronous wire (not shown).

Each of servo pistons 16, 16 includes a piston 16a for dividing servo piston 16 into two chambers, namely, a high oil chamber 16b and a low oil chamber 16c.

For controlling hydraulic pressure of servo pistons 16, 16 described above, there is provided a transmission control valve 19 which acts as a hydraulic control system. Transmission control valve 19 and servo pistons 16, 16 are connected via a high oil passage 17 (connected to high oil chambers 16b, 16b) and a low oil passage 18 (connected to low oil chambers 16c, 16c).

Transmission control valve 19 has a port 19a connecting to high oil passage 17, and a port 19b connecting to low oil passage 18.

Transmission control valve 19 also has a line pressure port 19c provided for a line pressure supplied from an oil source (not shown) having an oil pump (not shown) and a relief valve (not shown).

Transmission control valve 19 also has a transmission spool 19d which is interlocked with a lever 20 and a precision cam 21. Moreover, transmission control valve 19 is so driven with a stepping motor 22 as to displace axially.

Precise cam 21 is disposed at a lower end of a shaft of one of trunnions 14, 14, thus sensing trunnion 14's movement in the axial direction and gyration direction. The thus sensed movement of trunnion 14 is fed-back to transmission control valve 19.

Moreover, there is provided a CVT control unit 23 as an electronic control system for driving stepping motor 22.

Signals from a throttle opening sensor 24, engine speed sensor 25, an input disc rotation sensor 26, an output shaft rotation sensor 27 (vehicle speed sensor), an inhibitor switch 28, an oil temperature sensor 29 and the like are inputted to CVT control unit 23.

Hereinafter described is first power roller 10 used for the toroidal CVT according to the first embodiment, the second embodiment, the third embodiment, the fourth embodiment and the fifth embodiment of the present invention.

The term "line contact" is distinguished from the term "point contact". Area of the line contact does not necessarily cover all the side face of a conical roller bearing which acts as a rolling element.

(First Embodiment)

Figure 3:
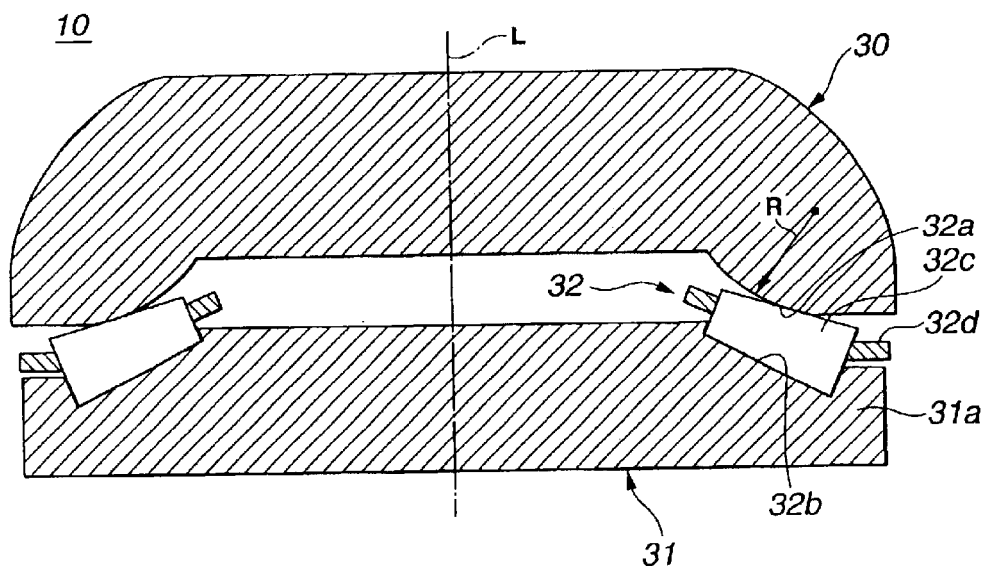
FIG. 3 is a cross section of a first power roller 10 adopted into the toroidal continuously variable transmission, according to a first embodiment of the present invention.

FIG. 3 shows a cross section of first power roller 10 used for the toroidal CVT, according to the first embodiment of the present invention.

Herein, second power roller 11 has substantially the same construction as that of first power roller 10, and therefore, repeated explanations are to be omitted.

First power roller 10 has an inner wheel 30, an outer wheel 31 and a conical roller bearing 32. Conical roller bearing 32 acts as a power roller bearing, and is shaped substantially into a frustum of a cone. Inner wheel 30 can transmit a power of first input disc 3 to output disc 8 by friction. Outer wheel 31 is swingably or slidably held to trunnion 14. Conical roller bearing 32 bears inner wheel 30 in such a manner that inner wheel 30 rotates relative to outer wheel 31.

Outer wheel 31 has an outer periphery which is united with a guide section 31a for guiding a greater diameter end (facing substantially radially outward) of a conical roller 32c.

Inner wheel 30 is formed with an inner wheel orbital face 32a, while outer wheel 31 is formed with an outer wheel orbital face 32b. Conical roller bearing 32 has conical roller 32c (rolling element) interposed between inner wheel orbital face 32a and outer wheel orbital face 32b. Moreover, conical roller bearing 32 has a holder 32d for holding a plurality of conical rollers 32c. In sum, conical roller bearing 32 is constituted of inner wheel orbital face 32a, outer wheel orbital face 32b, conical roller 32c, and holder 32d.

FIG. 3 also shows a rotation shaft L of first power roller 10. In the cross section of first power roller 10, inner wheel orbital face 32a is shaped substantially into an arc having a radius R of curvature. Herein, radius R has its circular center on inner wheel 30's side. Being constructed above in the cross section of first power roller 10, inner wheel orbital face 32a is a curved face which is an aggregate of a plurality of radii R of curvature.

On the other hand in the cross section of first power roller 10, outer wheel orbital face 32b is shaped substantially into a rectangular groove matching axially with conical roller 32c.

More specifically, construction of conical roller bearing 32 relative to inner wheel 30 and outer wheel 31 can be described as below:

A contact section between conical roller 32c and inner wheel orbital face 32a is a point at which a convex curved face (side face of conical roller 32c) and a convex curved face (of inner wheel orbital face 32a) cross each other. On the other hand, a contact section between conical roller 32c and outer wheel orbital face 32b is a line on which the convex curved face (side face of conical roller 32c) contacts a wall of the rectangular groove (of outer wheel orbital face 32b). In other words, outer wheel 31's side (formed with guide section 31*a*) of conical roller 32*c* and outer wheel orbital face 32*b* cause the line contact, while inner wheel 30's side (free of guide section 31*a* [for inner wheel 30: would-be guide section 30*a*—to be described afterward]) of conical roller 32*c* and inner wheel orbital face 32*a* cause the point contact.

Hereinafter described is operation of first power roller 10, according to the first embodiment of the present invention.

<Operation: Change Gear Ratio Control—First Embodiment>

The toroidal CVT can vary change gear ratio by displacing trunnions 14, 14 axially (upward and downward in FIG. 2) and gyrating first power rollers 10, 10.

More specifically described as below: CVT control unit 23 sends a driving instruction for obtaining the target change gear ratio, to thereby turn stepping motor 22 and displace transmission spool 19*d*. With this, an operation oil is delivered to servo piston chamber of one of servo pistons 16, 16 while the operation oil is drained from servo piston chamber of the other of servo pistons 16, 16, to thereby displace trunnions 14, 14 axially for gyration.

Then, power roller shafts 15, 15 are offset from a rotational center of the disc. The above offset can cause a side slip force to a contact between first power roller 10 and input disc 3 and a contact between first power roller 10 and output disc 8, thus gyrating first power rollers 10, 10.

The above offset (of power roller shafts 15) and gyration (of first power rollers 10, 10) then cause the following operation:

The gyration and offset can be transmitted to transmission spool 19*d* via precision cam 21 and lever 20. Then, first power rollers 10, 10 stop at a position for achieving an equilibrium with respect to stepping motor 22, thus making a predetermined gyration angle. At this point in time, displaced trunnions 14, 14 can be returned to the original rotational center of the disc, thus stopping gyration of first power rollers 10, 10. It is the gyration angle of first power rollers 10, 10 that determines the change gear ratio depends on.

The <Operation: change gear ratio control> described above concerning first power rollers 10, 10 also applies to second power rollers 11, 11.

<Operation: Load Applied to Conical Roller Bearing—First Embodiment>

Figure 4:
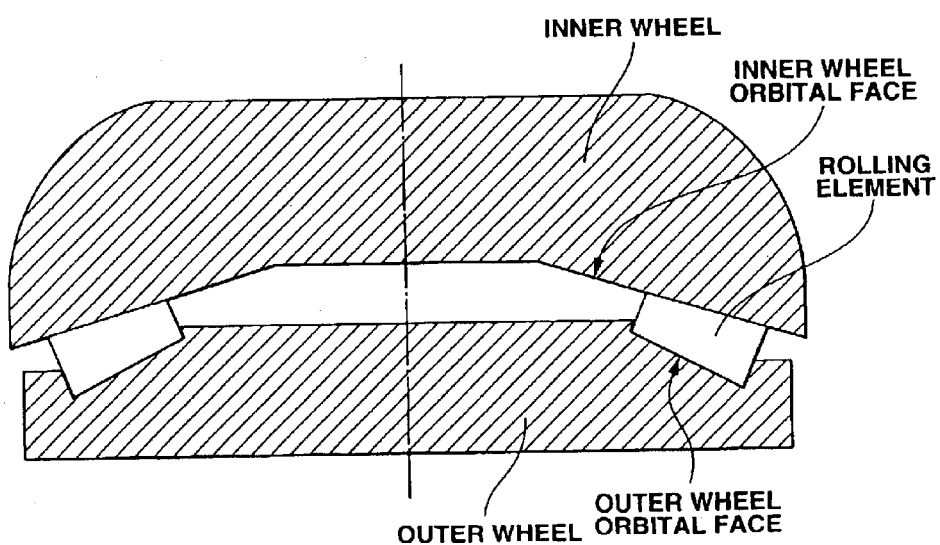
FIG. 4 is a cross section of a power roller for comparison with the first power roller 10 in FIG. 3.

FIG. 4 shows a power roller having a rolling element and an inner wheel orbital face making therebetween a line contact while the rolling element and an outer wheel orbital face also making therebetween a line contact.

In the toroidal CVT, it is the friction that contributes to conveyance of the torque between an input disc and an inner wheel of the power roller and between an output disc and the inner wheel of the power roller. Thereby, a thrust force for causing the friction is applied to the inner wheel from each of the input disc and the output disc.

Figure 5:
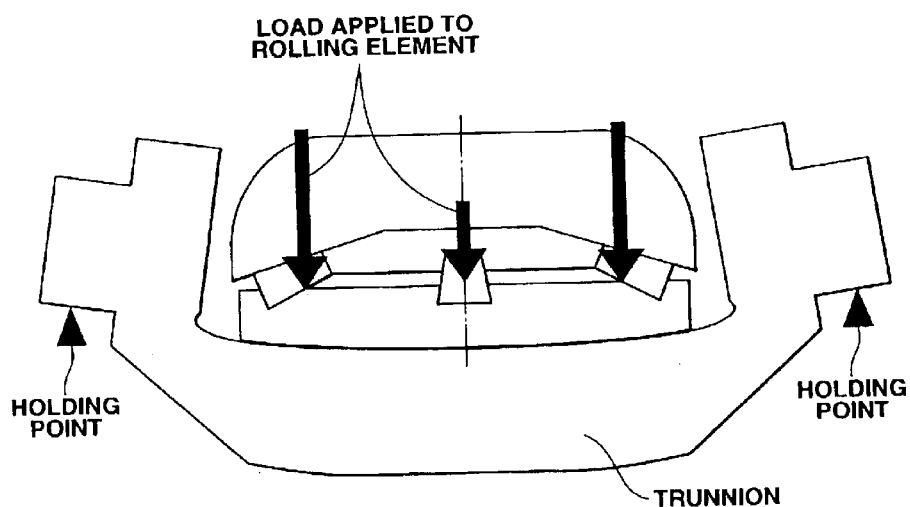
FIG. 5 shows an operation of the power roller in FIG. 4, in which deformation of a trunnion (substantially into a bow) and deformation of an outer wheel (substantially into a bow) cause an ununiformity in a load applied to a rolling element.
Figure 6:
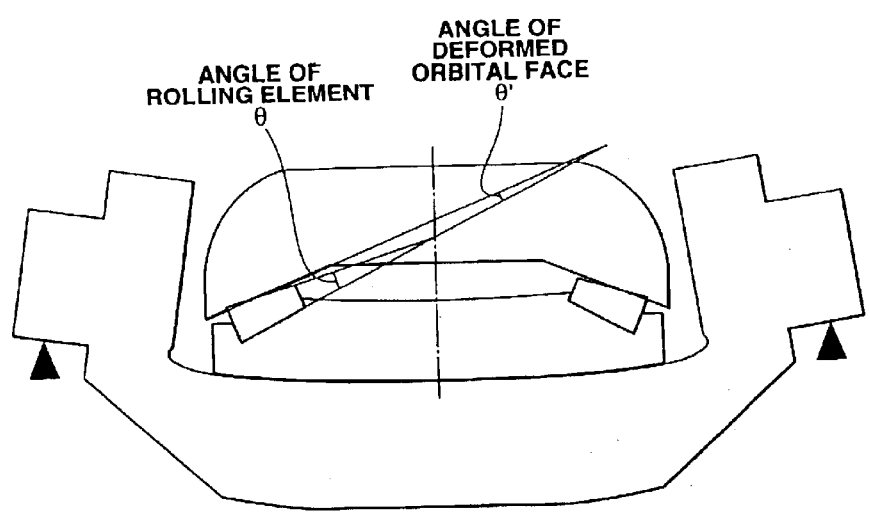
FIG. 6 shows the operation of the power roller in FIG. 4, in which deformation of the trunnion (substantially into the bow) and deformation of the outer wheel (substantially into the bow) cause an edge load.

The thrust force thus applied from the input disc and the output disc to the inner wheel is then loaded to a trunnion via a power roller bearing, to thereby hold the trunnion to an upper shaft end (holding point in FIG. 5) and a lower shaft end (holding point in FIG. 5). Thereby, as is seen in FIG. 5, the trunnion is deformed substantially into a bow, and the outer wheel also deforms into a bow following the thus deformed trunnion.

Compared with the outer wheel, the inner wheel is less likely to deform since the inner wheel is thicker than the outer wheel. Thereby, the load applied to each of the rolling elements is likely to cause ununiformity (namely, causing an offset load).

In other words, the above can be described as below:

The load may get heavy in the vicinity of each of the upper shaft end (holding point in FIG. 5) and the lower shaft end (holding point in FIG. 5) of the trunnion. On the contrary, the load may get lighter in a position away from each of the upper shaft end and the lower shaft end of the trunnion. The lightest load can be observed around a rotation shaft of the power roller, which is a position farthest away from each of the upper shaft end and the lower shaft end of the trunnion.

As described above, the load applied to each of the rolling elements may cause ununiformity, resulting in decrease in durability of the rolling element and the outer wheel.

FIG. 4 shows a conical roller bearing as the power roller bearing. Using the conical roller bearing makes the line contact between the rolling element and the inner wheel orbital face and between the rolling element and the outer wheel orbital face, thus increasing rigidity which is responsible for decreased load uniformity. In sum, the conical roller bearing making the line contact has smaller load uniformity than the one making (including) a point contact.

The outer wheel which may be deformed substantially into the bow following the deformed trunnion (into the bow) may change an angle between the outer wheel orbital face and the inner wheel orbital face. More specifically, the angle may change from θ (before deformation) to θ' (after deformation), where θ'<θ. The thus changed (reduced) angle θ' is smaller than an imaginary apex (or vertex) angle of a frustum of a cone of the rolling element, thereby causing an edge load. Herein, the edge load is defined as below:

An edge of the rolling element causing a deviated abutment on the orbital face in such a manner as to bring about an excessively high bearing load (pressure).

Contrary to the power roller causing the edge load as described above, the first power roller 10 according to the first embodiment of the present invention has the following construction:

Conical roller 32*c* and inner wheel orbital face 32*a* make the point contact, while conical roller 32*c* and outer wheel orbital face 32*b* make the line contact.

The point contact and the line contact according to the first embodiment in FIG. 3 can have lower rigidity than the both line contacts in FIG. 4, thus absorbing (preventing) deformation of trunnion 14 with ease and thereby redressing ununiformity in load applied to each of rolling elements 32*c*.

The line contact between conical roller 32*c* and outer wheel orbital face 32*b* allows conical roller 32*c* to roll in the wake of outer wheel orbital face 32*b*. With this, outer wheel orbital face 32*b* which may be deformed after deformation of trunnion 14 may change the angle of conical roller 32*c* relative to inner wheel 30. Even in this occasion, the convex curved face of inner wheel orbital face 32*a* can prevent the edge load which may be caused by the deviated abutment of an edge of conical roller 32*c* on inner wheel orbital face 32*a*.

Moreover, outer wheel 31 having guide section 31*a* for guiding conical roller 32*c* can prevent the greater diameter end of conical roller 32*c* from causing the deviated abutment on guide section 31*a*. In other words, conical roller 32*c* rolls in the wake of outer wheel orbital face 32*b* and guide section 31*a* is formed on outer wheel 31, thereby preventing change in angle between conical roller 32*c* and guide section 31*a*.

In addition, hereinafter described referring to FIG. 4 is comparison between the bearing pressure applied to the inner wheel orbital face and the bearing pressure applied to the outer wheel orbital face, which two faces are subjected to the line contact. The outer wheel orbital face is part of an outer periphery of a cone, namely, a convex curved face, while the inner wheel orbital face is an inner periphery of a cone, namely, a concave curved face. Thus, the rolling element has lower contact pressure on its inner wheel's side than its outer wheel's side.

Contrary to the above description referring to FIG. 4, the point contact between inner wheel orbital face 32a and conical roller 32c according to the first embodiment in FIG. 3 can keep the bearing pressure substantially equal to that caused by the line contact between outer wheel orbital face 32b and conical roller 32c, even when the bearing pressure is increased. In sum, adopting the point contact between inner wheel orbital face 32a and conical roller 32c can prevent decrease in fatigue life.

Described hereinafter are effects of the toroidal CVT, according to the first embodiment.

<Effect—First Embodiment>
(1) The toroidal CVT using conical roller bearing 32 as the power roller bearing is summarized to make the following contacts:

Inner wheel 30's side: Conical roller 32c makes the point contact with inner wheel orbital face 32a.

Outer wheel 31's side: Conical roller 32c makes the line contact with outer wheel orbital face 32b.

The "point" and the "line" contribute to reduced rigidity in the contact section, thus redressing ununiformity in load applied to conical roller 32c, improving durability of conical roller bearing 32, and preventing fallen conical roller 32c.

(2) Guide section 31a for guiding the greater diameter end of conical roller 32c is disposed on outer wheel 31, while inner wheel 30 is free of guide section. The line contact is made between outer wheel orbital face 32b and outer wheel 31's side of conical roller 32c, while the point contact is made between inner wheel orbital face 32a and inner wheel 30's side of conical roller 32c.

The above construction contributes to redress of ununiformity in load applied to conical roller 32c as well as prevention of the deviated abutment (which may be caused by fallen conical roller 32c) of guide section 31a on the greater diameter end of conical roller 32c.

(3) In the cross section including rotation shaft L of first power roller, inner wheel orbital face 32a on inner wheel 30 making the point contact is shaped substantially into a convex curved face.

The above construction allows conical roller 32c and outer wheel orbital face 32b (which makes the line contact with conical roller 32c) to have an ordinary configuration as a conical roller bearing, thus lowering production cost thereof.

(4) Guide section 31a for guiding the greater diameter end of conical roller 32c is disposed on outer wheel 31.

The above construction contributes to minimizing increase in bearing pressure which is applied to the point contact made on inner wheel 30.

(Second Embodiment)

The toroidal CVT according to the second embodiment generally has the following construction:

A first contact is made between the rolling element and the inner wheel orbital face, while a second contact is made between the rolling element and the outer wheel orbital face. One of the first contact and the second contact has a first contact width extending in an axial direction of the rolling element, and the other of the first contact and the second contact has a second contact width extending in an axial direction of the rolling element. Herein, the first contact width is smaller than the second contact width.

Figure 7:
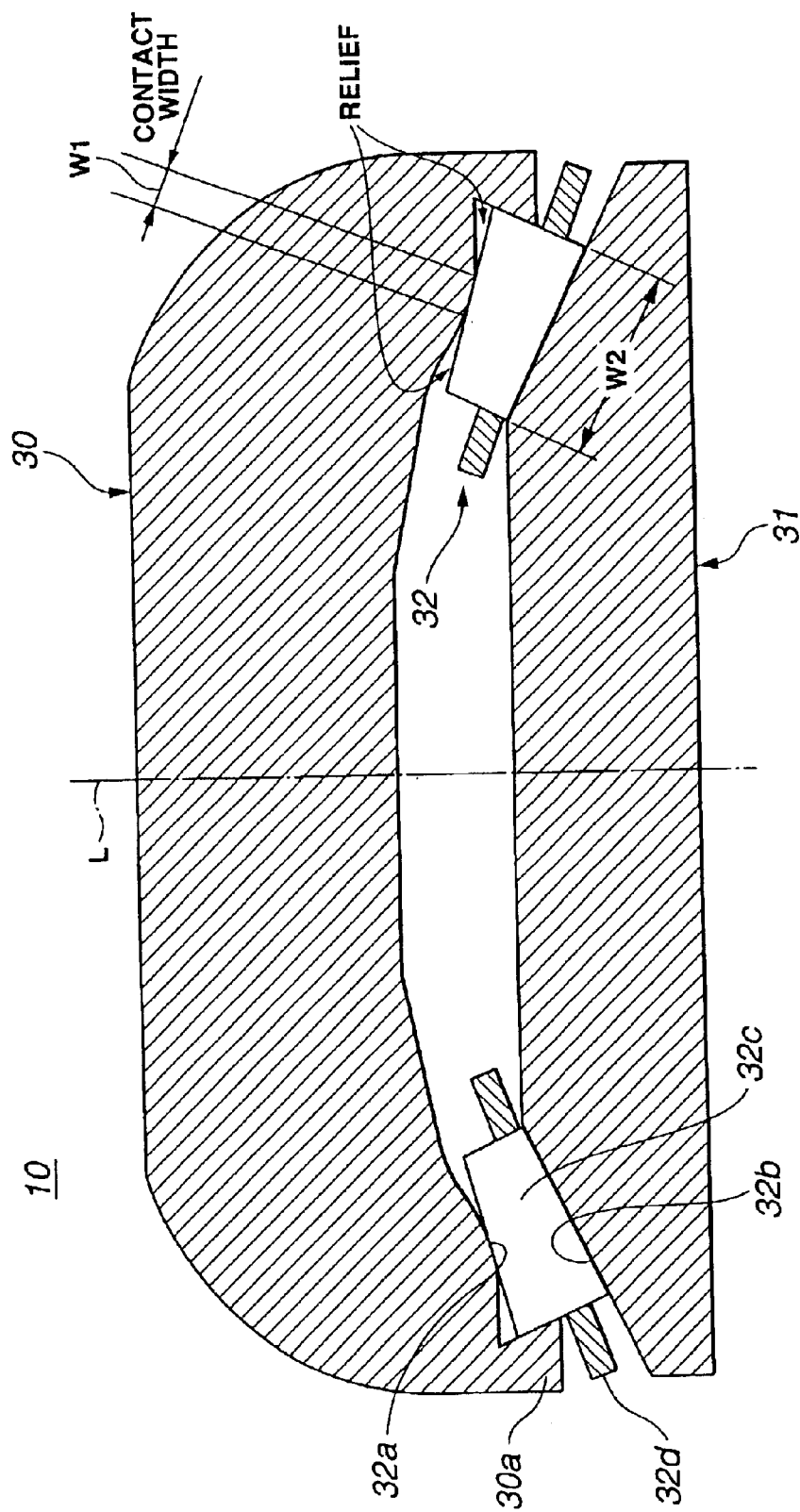
FIG. 7 is a cross section of the first power roller 10 adopted into the toroidal continuously variable transmission, according to a second embodiment of the present invention.

FIG. 7 shows a cross section of first power roller 10 used for the toroidal CVT, according to the second embodiment of the present invention.

First power roller 10 in FIG. 7 has inner wheel 30, outer wheel 31 and conical roller bearing 32 (power roller bearing).

Inner wheel 30 has an outer periphery which is united with a guide section 30a for guiding the greater diameter end of conical roller 32c.

Inner wheel 30 is formed with inner wheel orbital face 32a, while outer wheel 31 is formed with outer wheel orbital face 32b. Conical roller bearing 32 has conical roller 32c (rolling element) interposed between inner wheel orbital face 32a and outer wheel orbital face 32b. Moreover, conical roller bearing 32 has holder 32d for holding a plurality of conical rollers 32c. In sum, conical roller bearing 32 is constituted of inner wheel orbital face 32a, outer wheel orbital face 32b, conical roller 32c, and holder 32d.

FIG. 7 also shows rotation shaft L of first power roller 10. In the cross section of first power roller 10, inner wheel orbital face 32a is shaped substantially into a trapezium having a base and adjacent tilts on both sides of the base. The base secures contact with conical roller 32c, while each of two tilts on both sides of the base leaves a relief for conical roller 32c.

On the other hand in the cross section of first power roller 10, outer wheel orbital face 32b is shaped substantially into a rectangular groove matching axially with conical roller 32c.

More specifically, construction of conical roller bearing 32 relative to inner wheel 30 and outer wheel 31 can be described as below:

A contact section between conical roller 32c and inner wheel orbital face 32a is a line on which a convex curved face (side face of conical roller 32c) and the base (of the trapezium) contact each other, making a first contact width W1 extending in an axial direction of rolling element. On the other hand, a contact section between conical roller 32c and outer wheel orbital face 32b is a line on which the convex curved face (side face of conical roller 32c) contacts a wall of the rectangular groove (of outer wheel orbital face 32b), making a second contact width W2 which is greater than first contact width W1 and extends in the axial direction of rolling element.

Hereinafter described is operation of first power roller 10, according to the second embodiment of the present invention.

<Operation—Second Embodiment>

In addition to the line contact between conical roller 32c and outer wheel orbital face 32b, conical roller 32c and inner wheel orbital face 32a also make the line contact having first contact width W1. First contact width W1 in FIG. 7 is, however, smaller in width than its counterpart in FIG. 4 in an entire area of the conical roller (rolling element), thus drastically reducing rigidity of the contact on the inner wheel.

Described hereinafter are effects of the toroidal CVT, according to the second embodiment.

<Effect—Second Embodiment>
(5) The toroidal CVT using conical roller bearing 32 as the power roller bearing is summarized to make the following contacts:

The first contact is made between rolling element 32c and inner wheel orbital face 32a.

The second contact is made between rolling element 32c and outer wheel orbital face 32b.

One of the first contact and the second contact has first contact width W1 extending in the axial direction of rolling element 32c, and the other of the first contact and the second contact has second contact width W2 extending in the axial direction of rolling element 32c. Herein, second contact width W2 is greater than first contact width W1.

W1<W2 contributes to reduced rigidity of the first contact and the second contact, thus redressing ununiformity in the load which is applied to conical roller 32c, improving durability of conical roller bearing 32, and preventing fallen conical roller 32c.

(6) Guide section 30a for guiding the outer ends of conical roller 32c disposed on inner wheel 30 contributes to simplified configuration of outer wheel 31, thus facilitating machining of outer wheel 31.

(Third Embodiment)

The toroidal CVT according to the third embodiment generally has a construction that is substantially the same as that of the first embodiment, but having the guide section on the inner wheel.

Figure 8:
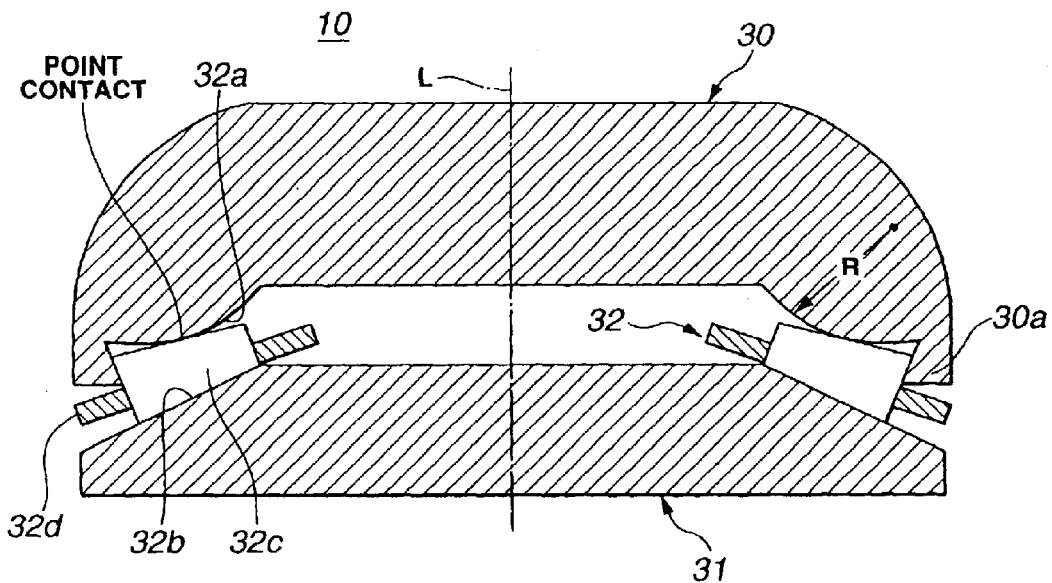
FIG. 8 is a cross section of the first power roller 10 adopted into the toroidal continuously variable transmission, according to a third embodiment of the present invention.

FIG. 8 shows a cross section of first power roller 10 used for the toroidal CVT, according to the third embodiment of the present invention.

First power roller 10 in FIG. 8 has inner wheel 30, outer wheel 31 and conical roller bearing 32 (power roller bearing).

Inner wheel 30 has the outer periphery which is united with guide section 30a for guiding the greater diameter end of conical roller 32c.

Inner wheel 30 is formed with inner wheel orbital face 32a, while outer wheel 31 is formed with outer wheel orbital face 32b. Conical roller bearing 32 has conical roller 32c (rolling element) interposed between inner wheel orbital face 32a and outer wheel orbital face 32b. Moreover, conical roller bearing 32 has holder 32d for holding a plurality of conical rollers 32c. In sum, conical roller bearing 32 is constituted of inner wheel orbital face 32a, outer wheel orbital face 32b, conical roller 32c, and holder 32d.

FIG. 8 also shows rotation shaft L of first power roller 10. In the cross section of first power roller 10, inner wheel orbital face 32a is shaped substantially into an arc having a radius R of curvature. Herein, radius R has its circular center on inner wheel 30's side. Being constructed above in the cross section of first power roller 10, inner wheel orbital face 32a is a curved face which is an aggregate of a plurality of radii R of curvature.

On the other hand in the cross section of first power roller 10, outer wheel orbital face 32b is shaped substantially into a rectangular groove matching axially with conical roller 32c.

More specifically, construction of conical roller bearing 32 relative to inner wheel 30 and outer wheel 31 can be described as below:

A contact section between conical roller 32c and inner wheel orbital face 32a is a point at which a convex curved face (side face of conical roller 32c) and a convex curved face (of inner wheel orbital face 32a) contact each other. On the other hand, a contact section between conical roller 32c and outer wheel orbital face 32b is a line on which the convex curved face (side face of conical roller 32c) contacts a wall of the rectangular groove (of outer wheel orbital face 32b).

Hereinafter described is operation of first power roller 10, according to the third embodiment of the present invention.

<Operation—Third Embodiment>

Figure 9:
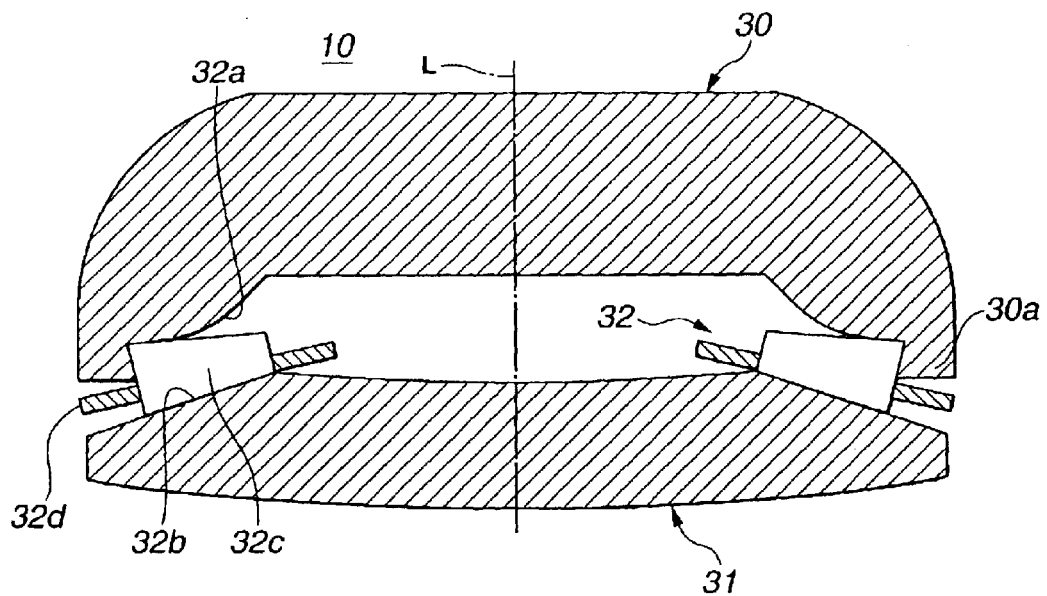
FIG. 9 is an operation of the first power roller 10 in FIG. 8, in which deformation of the trunnion (substantially into the bow) and deformation of the outer wheel (substantially into the bow) does not cause the edge load.

The line contact between conical roller 32c and outer wheel orbital face 32b allows conical roller 32c to roll in the wake of outer wheel orbital face 32b. With this, outer wheel orbital face 32b which may be deformed after deformation of trunnion 14 may change the angle of conical roller 32c relative to inner wheel 30, as is seen in FIG. 9. Even in this occasion, the convex curved face of inner wheel orbital face 32a can prevent the edge load which may be caused by the deviated abutment of an edge of conical roller 32c on inner wheel orbital face 32a.

<Effect—Third Embodiment>

The toroidal CVT according to the third embodiment can bring about the effects (1) and (3) according to the first embodiment, and the effect (5) according to the second embodiment.

(Fourth Embodiment)

The toroidal CVT according to the fourth embodiment generally has a construction that is substantially the same as that of the first embodiment, but the outer wheel making the point contact while the inner wheel making the line contact.

Figure 10:
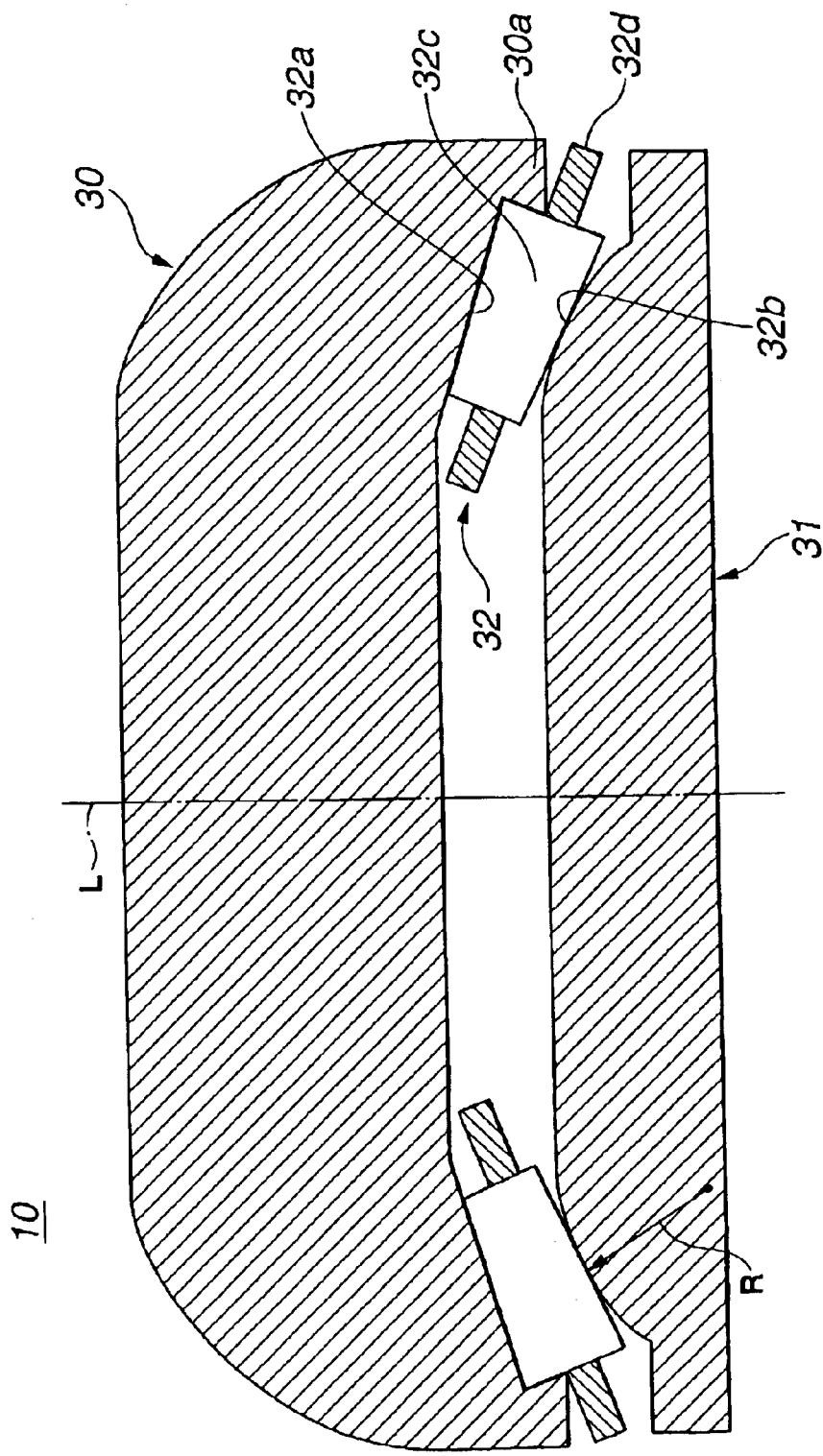
FIG. 10 is a cross section of the first power roller 10 adopted into the toroidal continuously variable transmission, according to a fourth embodiment of the present invention.

FIG. 10 shows a cross section of first power roller 10 used for the toroidal CVT, according to the fourth embodiment of the present invention.

First power roller 10 in FIG. 10 has inner wheel 30, outer wheel 31 and conical roller bearing 32 (power roller bearing).

Inner wheel 30 has the outer periphery which is united with guide section 30a for guiding the greater diameter end of conical roller 32c.

Inner wheel 30 is formed with inner wheel orbital face 32a, while outer wheel 31 is formed with outer wheel orbital face 32b. Conical roller bearing 32 has conical roller 32c (rolling element) interposed between inner wheel orbital face 32a and outer wheel orbital face 32b. Moreover, conical roller bearing 32 has holder 32d for holding a plurality of conical rollers 32c. In sum, conical roller bearing 32 is constituted of inner wheel orbital face 32a, outer wheel orbital face 32b, conical roller 32c, and holder 32d.

FIG. 10 also shows rotation shaft L of first power roller 10. In the cross section of first power roller 10, inner wheel orbital face 32a is shaped substantially into a rectangular groove matching axially with conical roller 32c.

On the other hand in the cross section of first power roller 10, outer wheel orbital face 32b is shaped substantially into an arc having a radius R of curvature. Herein, radius R has its circular center on outer wheel 31's side. Being constructed above in the cross section of first power roller 10, outer wheel orbital face 32b is a curved face which is an aggregate of a plurality of radii R of curvature.

More specifically, construction of conical roller bearing 32 relative to inner wheel 30 and outer wheel 31 can be described as below:

A contact section between conical roller 32c and inner wheel orbital face 32a is a line on which the convex curved face (side face of conical roller 32c) contacts an inner wall of a cone. On the other hand, a contact section between conical roller 32c and outer wheel orbital face 32b is a point at which the convex curved face (side face of conical roller 32c) and a convex curved face (of outer wheel orbital face 32b) contact each other. In other words, inner wheel 30's side (formed with guide section 30a) of conical roller 32c and inner wheel orbital face 32a cause the line contact, while outer wheel 31's side (free of guide section 30a [for outer wheel 31: would-be guide section 31a]) of conical roller 32c and outer wheel orbital face 32b cause the point contact.

Hereinafter described is operation of first power roller 10, according to the fourth embodiment of the present invention.

<Operation—Fourth Embodiment>

Outer wheel orbital face 32b has an overall construction shaped substantially into a cone having convex curved face, allowing the convex curved face to make the point contact with conical roller 32c. The above construction having the both convex curved faces facilitates machining.

Described hereinafter are effects of the toroidal CVT, according to the fourth embodiment.

<Effect—Fourth Embodiment>

The toroidal CVT according to the fourth embodiment can bring about the effects (1), (2) and (3) according to the first embodiment, and the effect (6) according to the second embodiment.

(Fifth Embodiment)

The toroidal CVT according to the fifth embodiment has the rolling element having an axial cross section shaped substantially into a convex curved face (or substantially into a barrel), and allowing each of the inner wheel orbital face and the outer wheel orbital face to have an axial cross section shaped substantially into a concave curved face.

FIG. 11 shows a cross section of first power roller 10 used for the toroidal CVT, according to the fifth embodiment of the present invention.

First power roller 10 in FIG. 11 has inner wheel 30, outer wheel 31 and conical roller bearing 32 (power roller bearing).

Outer wheel 31 has the outer periphery which is united with guide section 31a for guiding the greater diameter end of conical roller 32c.

Inner wheel 30 is formed with inner wheel orbital face 32a, while outer wheel 31 is formed with outer wheel orbital face 32b. Conical roller bearing 32 has conical roller 32c (rolling element) interposed between inner wheel orbital face 32a and outer wheel orbital face 32b. Moreover, conical roller bearing 32 has holder 32d for holding a plurality of conical rollers 32c. In sum, conical roller bearing 32 is constituted of inner wheel orbital face 32a, outer wheel orbital face 32b, conical roller 32c, and holder 32d.

FIG. 10 also shows rotation shaft L of first power roller 10. In the cross section of first power roller 10, inner wheel orbital face 32a is shaped substantially into an arc having a radius Ri of curvature. Herein, radius Ri has its circular center on outer wheel 31' side. Being constructed above in the cross section of first power roller 10, inner wheel orbital face 32a is a curved face which is an aggregate of a plurality of radii Ri of curvature.

On the other hand in the cross section of first roller 10, outer wheel orbital face 32b is shaped substantially into an arc having a radius Ro of curvature. Herein, radius Ro has its circular center on inner wheel 30' side. Moreover, radius Ro is smaller than radius Ri (Ro<Ri). Being constructed above in the cross section of first power roller 10, outer wheel orbital face 32b is a curved face which is an aggregate of a plurality of radii Ro of curvature.

Conical roller 32c has an axial cross section having a radius Rb of curvature, thus forming a convex curved face. Herein, radius Rb is substantially equal to radius Ro (Rb≈Ro).

More specifically, construction of conical roller bearing 32 relative to inner wheel 30 and outer wheel 31 can be described as below:

Radius Ro smaller than radius Ri makes the following contact:

A contact section between conical roller 32c and inner wheel orbital face 32a is a point at which a side face (of conical roller 32c) partly contacts an inner wall of the arc.

On the other hand, radius Ro substantially equal to radius Rb makes the following contact:

A contact section between conical roller 32c and outer wheel orbital face 32b is a curved line on which a side face (of conical roller 32c) and a concave curved face (of outer wheel orbital face 32b) make an entire contact. In other words, outer wheel 31's side (formed with guide section 31a) of conical roller 32c and outer wheel orbital face 32b make the curved line contact, while inner wheel 30's side (free of guide section 30a) of conical roller 32c and inner wheel orbital face 32a make the point contact.

Hereinafter described is operation of first power roller 10, according to the fifth embodiment of the present invention.

<Operation—Fifth Embodiment>

Conical roller 32c having the axial cross section shaped substantially into the convex curved face and each of inner wheel orbital face 32a and outer wheel orbital face 32b having the axial cross section shaped substantially into the concave curved face can cause a construction substantially the same as that of a self-aligning roller bearing. Even when inner wheel 30 may have its rotation shaft deviated from rotation shaft L of first power roller 10, a self-aligning function will work to recover the rotation shaft of inner wheel 30 to rotation shaft L of first power roller 10.

Described hereinafter are effects of the toroidal CVT, according to the fifth embodiment.

<Effect—Fifth Embodiment>

The toroidal CVT according to the fifth embodiment can bring about the effects (1), (2) and (4) according to the first embodiment, and an effect (7) described below:

(7) Conical roller 32c has the axial cross section shaped substantially into the convex curved face, while each of inner wheel orbital face 32a and outer wheel orbital face 32b has the axial cross section shaped substantially into the concave curved face. With the above construction, each of inner wheel orbital face 32a and outer wheel orbital face 32b is allowed to have a configuration like that of an ordinary ball bearing, and thereby contributes to low production cost. In addition, conical roller 32c, inner wheel orbital face 32a, and outer wheel orbital face 32b achieve the self-alignment of rotation shaft of inner wheel 30 with rotation shaft L of first power roller 10.

Although the present invention has been described above by reference to the first embodiment, the second embodiment, the third embodiment, the fourth embodiment and the fifth embodiment, the present invention is not limited to the five embodiments described above. Modifications and variations of the embodiments described above will occur to those skilled in the art, in light of the above teachings.

This application is based on a prior Japanese Patent Application No. P2002-039457 (filed on Feb. 18, 2002 in Japan). The entire contents of the Japanese Patent Application No. P2002-039457 from which priority is claimed is incorporated herein by reference, in order to take some protection against mis-translation or omitted portions.

The scope of the present invention is defined with reference to the following claims.

What is claimed is:

1. A toroidal continuously variable transmission comprising:
   1) a first input disc formed with a toroidal groove;
   2) a second input disc formed with a toroidal groove;
   3) an output disc formed with:
      a first toroidal groove opposed to the toroidal groove of the first input disc, and
      a second toroidal groove opposed to the toroidal groove of the second input disc;
   4) a trunnion; and
   5) a plurality of power rollers each of which is interposed in one of the positions including the following:

I) between a wall of the toroidal groove of the first input disc and a wall of the first toroidal groove of the output disc, and II) between a wall of the toroidal groove of the second input disc and a wall of the second toroidal groove of the output disc, each of the power rollers being gyratorily held with the trunnion, each of the power rollers comprising:
i) an inner wheel for transmitting a power of one of the first input disc and the second input disc to the output disc,
ii) an outer wheel held with the trunnion, and
iii) a power roller bearing for bearing the inner wheel in such a manner that the inner wheel rotates relative to the outer wheel, the power roller bearing comprising:
A) an inner wheel orbital face formed on the inner wheel,
B) an outer wheel orbital face formed on the outer wheel, and
C) a rolling element interposed between the inner wheel orbital face and the outer wheel orbital face, the rolling element being shaped substantially into a frustum of a cone, a point contact being made between one of the following while a line contact being made between the other of the following:
a) the rolling element and the inner wheel orbital face, and
b) the rolling element and the outer wheel orbital face.

2. The toroidal continuously variable transmission as claimed in claim 1,
wherein one of the inner wheel and the outer wheel is formed with a guide section for guiding a diameter end of the rolling element, the diameter end facing substantially radially outward, and
wherein the line contact made between the rolling element and the wheel orbital face is disposed on the one of the inner and outer wheels that is formed with the guide section, while the point contact made between the rolling element and the wheel orbital face is disposed on the other of the inner and outer wheels that is free of the guide section.

3. The toroidal continuously variable transmission as claimed in claim 1, wherein one of the inner wheel orbital face and the outer wheel orbital face making the point contact with the rolling element is disposed in a cross section including a rotation shaft of one of the power rollers, and is shaped substantially into a convex curved face in the cross section.

4. The toroidal continuously variable transmission as claimed in claim 1,
wherein the rolling element has an axial cross section shaped substantially into a convex curved face, and
wherein each of the inner wheel orbital face and the outer wheel orbital face has an axial cross section shaped substantially into a concave curved face.

5. The toroidal continuously variable transmission as claimed in claim 2, wherein the guide section for guiding the diameter end of the rolling element is disposed on the inner wheel.

6. The toroidal continuously variable transmission as claimed in claim 2, wherein the guide section for guiding the diameter end of the rolling element is disposed on the outer wheel.

7. The toroidal continuously variable transmission as claimed in claim 4, wherein the line contact forms a curved line in a cross section including a rotation shaft of one of the power rollers.

8. A toroidal continuously variable transmission comprising:
1) a first input disc formed with a toroidal groove;
2) a second input disc formed with a toroidal groove;
3) an output disc formed with:
a first toroidal groove opposed to the toroidal groove of the first input disc, and
a second toroidal groove opposed to the toroidal groove of the second input disc;
4) a trunnion; and
5) a plurality of power rollers each of which is interposed in one of the positions including the following:
I) between a wall of the toroidal groove of the first input disc and a wall of the first toroidal groove of the output disc, and
II) between a wall of the toroidal groove of the second input disc and a wall of the second toroidal groove of the output disc,
each of the power rollers being gyratorily held with the trunnion,
each of the power rollers comprising:
i) an inner wheel for transmitting a power of one of the first input disc and the second input disc to the output disc,
ii) an outer wheel held with the trunnion, and
iii) a power roller bearing for bearing the inner wheel in such a manner that the inner wheel rotates relative to the outer wheel, the power roller bearing comprising:
A) an inner wheel orbital face formed on the inner wheel,
B) an outer wheel orbital face formed on the outer wheel, and
C) a rolling element interposed between the inner wheel orbital face and the outer wheel orbital face, the rolling element being shaped substantially into a frustum of a cone, a first contact width being made between one of the following while a second contact width greater than the first contact width being made between the other of the following:
a) the rolling element and the inner wheel orbital face, and
b) the rolling element and the outer wheel orbital face.

9. The toroidal continuously variable transmission as claimed in claim 8,
wherein one of the inner wheel and the outer wheel is formed with a guide section for guiding a diameter end of the rolling element, the diameter end facing substantially outward, and
wherein the first contact width made between the rolling element and the wheel orbital face is disposed on the one of the inner and outer wheels that is formed with the guide section, while the second contact width made between the rolling element and the wheel orbital face is disposed on the other of the inner and outer wheels that is free of the guide section.

10. The toroidal continuously variable transmission as claimed in claim 8, wherein one of the inner wheel orbital face and the outer wheel orbital face making the first contact width with the rolling element is disposed in a cross section including a rotation shaft of one of the power rollers, and is shaped substantially into a trapezium having a base and adjacent tilts on both sides of the base in the cross section, the base contacting the rolling element while each of two tilts leaving a relief for the rolling element.

11. The toroidal continuously variable transmission as claimed in claim 9, wherein the guide section for guiding the diameter end of the rolling element is disposed on the inner wheel.

12. The toroidal continuously variable transmission as claimed in claim 9, wherein the guide section for guiding the diameter end of the rolling element is disposed on the outer wheel.

* * * * *